(12) United States Patent
Tsutsumi et al.

(10) Patent No.: US 10,666,172 B2
(45) Date of Patent: May 26, 2020

(54) MOTOR CONTROL DEVICE AND MOTOR CONTROL METHOD

(71) Applicant: FANUC CORPORATION, Yamanashi (JP)

(72) Inventors: Tomohisa Tsutsumi, Yamanashi-ken (JP); Yuuki Morita, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/229,868

(22) Filed: Dec. 21, 2018

(65) Prior Publication Data

US 2019/0199252 A1 Jun. 27, 2019

(30) Foreign Application Priority Data

Dec. 27, 2017 (JP) ................. 2017-250365

(51) Int. Cl.
*H02P 6/16* (2016.01)
*G01D 5/245* (2006.01)
(Continued)

(52) U.S. Cl.
CPC ............. *H02P 6/16* (2013.01); *G01D 5/2451* (2013.01); *G01D 5/2457* (2013.01); *G01P 13/04* (2013.01); *H02P 6/20* (2013.01); *H02P 2203/03* (2013.01)

(58) Field of Classification Search
CPC ...... H02P 1/00; H02P 1/04; H02P 1/16; H02P 1/163; H02P 1/18; H02P 1/22; H02P 1/24;
(Continued)

(56) References Cited

U.S. PATENT DOCUMENTS 5,717,301 A * 2/1998 Griebhammer ........... H02P 6/20
  318/286
7,800,336 B2 * 9/2010 Ide .......................... H02P 21/18
  318/432
(Continued)

FOREIGN PATENT DOCUMENTS

JP 4738122 B 9/1972
JP 4836041 B 11/1973
(Continued)

OTHER PUBLICATIONS

English Abstract for Japanese Publication No. 2015130733 A, published Jul. 16, 2015, 1 pg.
(Continued)

*Primary Examiner* — Antony M Paul
(74) *Attorney, Agent, or Firm* — Fredrikson & Byron, P.A.

(57) ABSTRACT

A motor control device includes: a polarity sensor configured to detect whether a magnetic pole position in a synchronous motor resides on a positive polarity side or a negative polarity side with reference to a reference position; a motor control unit configured to turn the synchronous motor from the polarity side detected by the polarity sensor toward an opposite polarity side through the reference position; and a magnetic pole position determination unit configured to determine, as the magnetic pole position, a position of the synchronous motor at the moment when the polarity changes, based on a detection result of the polarity sensor.

6 Claims, 7 Drawing Sheets

(51) Int. Cl.
*G01P 13/04* (2006.01)
*H02P 6/20* (2016.01)

(58) Field of Classification Search
CPC ...... H02P 1/46; H02P 1/48; H02P 3/00; H02P 3/025; H02P 3/065; H02P 3/12; H02P 3/18; H02P 6/00; H02P 6/003; H02P 6/005; H02P 6/008; H02P 6/04; H02P 6/06; H02P 6/08; H02P 6/12; H02P 6/14; H02P 6/22; H02P 6/24; H02P 7/00; H02P 7/0094; H02P 7/281; H02P 8/00; H02P 8/06; H02P 8/08; H02P 8/24; H02P 8/30; H02P 9/009; H02P 21/00; H02P 21/146; H02P 23/00; H02P 25/00; H02P 27/00; H02P 27/04; H02P 27/06; H02P 29/10
USPC ..... 318/400.01, 400.02, 700, 701, 727, 799, 318/800, 801, 430, 432, 400.4
See application file for complete search history.

(56) References Cited

U.S. PATENT DOCUMENTS

| | | | | |
|---|---|---|---|---|
| 8,310,183 | B2* | 11/2012 | Ide | H02P 21/26 318/400.02 |
| 9,973,121 | B2* | 5/2018 | Sun | H02P 7/295 |
| 2013/0307452 | A1 | 11/2013 | Sonoda et al. | |
| 2015/0192905 | A1 | 7/2015 | Ueda | |

FOREIGN PATENT DOCUMENTS

| | | |
|---|---|---|
| JP | 9512700 A | 12/1997 |
| JP | 10234196 A | 9/1998 |
| JP | 2002247881 A | 8/2002 |
| JP | 200771964 A | 3/2007 |
| JP | 2013243851 A | 12/2013 |
| JP | 2015130733 A | 7/2015 |
| WO | 9627233 A1 | 2/1996 |

OTHER PUBLICATIONS

English Abstract for Japanese Publication No. 2013243851 A, published Dec. 5, 2013, 2 pgs.
English Abstract and Machine Translation for Japanese Publication No. 2007-071964 A, published Mar. 22, 2007, 8 pgs.
English Abstract and Machine Translation for Japanese Publication No. H10-234196 A, published Sep. 2, 1998, 7 pgs.
English Machine Translation for Japanese Publication No. S48-036041 B, published Nov. 1, 1973, 4 pgs.
Partial English Machine Translation for Japanese Publication No. S47-038122 B, published Sep. 26, 1972, 1 pg (including English Machine Translation of Notice of Reasons for Refusal mailed by Japan Patent Office for Application No. 2017-250365, dated Nov. 5, 2019, 5 pgs, citing Japanese Publication No. S47-038122 B).
English Abstract and Machine Translation for Japanese Publication No. 2002-247881 A, published Aug. 30, 2002, 8 pgs.

* cited by examiner

MOTOR CONTROL DEVICE AND MOTOR CONTROL METHOD

CROSS-REFERENCE TO RELATED APPLICATION

This application is based upon and claims the benefit of priority from Japanese Patent Application No. 2017-250365 filed on Dec. 27, 2017, the contents of which are incorporated herein by reference.

BACKGROUND OF THE INVENTION

Field of the Invention

The present invention relates to a motor control device and a motor control method which use an incremental encoder.

Description of the Related Art

There are two types of rotary encoder which are used to control a motor: absolute and incremental. An incremental encoder outputs pulses in accordance with the amount of rotational displacement of the motor, whereas an absolute encoder outputs a code of the absolute position of the rotation angle from the reference position regardless of whether the motor rotates.

In the case of the incremental encoder, since the position information is not held when the power supply is turned off, it is necessary to detect the magnetic pole position of the synchronous motor every time the power supply is turned on. If the detected magnetic pole position deviates from the actual magnetic pole position, there is a risk of the motor turning in reverse, so that it is important to accurately detect the magnetic pole position.

As a method for detecting the magnetic pole position, there is disclosed a technique of roughly calculating the magnetic pole position of the rotor based on the behavior of the rotor of the electric motor when a current is applied to a predetermined excitation phase (see Japanese Laid-Open Patent Publication No. 2013-243851).

SUMMARY OF THE INVENTION

However, in Japanese Laid-Open Patent Publication No. 2013-243851, since the estimation of the magnetic pole position of the rotor is repeated until the rotor stops moving even when the current is applied to the predetermined excitation phase, the time required to detect the magnetic pole position is prone to be longer.

It is therefore an object of the present invention to provide a motor control device and a motor control method that can shorten the time required to detect the magnetic pole position.

A first aspect of the present invention resides in a motor control device, which includes: a polarity sensor configured to detect whether a magnetic pole position in a synchronous motor resides on a positive polarity side or a negative polarity side with reference to a reference position; a motor control unit configured to turn the synchronous motor from the polarity side detected by the polarity sensor toward an opposite polarity side through the reference position; and a magnetic pole position determination unit configured to determine, as the magnetic pole position, a position of the synchronous motor at the moment when a polarity changes, based on a detection result of the polarity sensor.

A second aspect of the present invention resides in a motor control method including: a first step of detecting whether a magnetic pole position in a synchronous motor resides on a positive polarity side or a negative polarity side with reference to a reference position; a second step of turning the synchronous motor from the polarity side detected at the first step toward an opposite polarity side through the reference position; and a third step of determining, as the magnetic pole position, a position of the synchronous motor at a moment when a polarity changes.

In the above-described aspects, the magnetic pole position can be grasped by only a single rotation control on the synchronous motor. Therefore, according to the aspects of the invention, it is possible to shorten the time required to detect the magnetic pole position.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A motor control device and a motor control method according to the present invention will be detailed below by giving preferred embodiments with reference to the accompanying drawings.

First Embodiment

Figure 1:
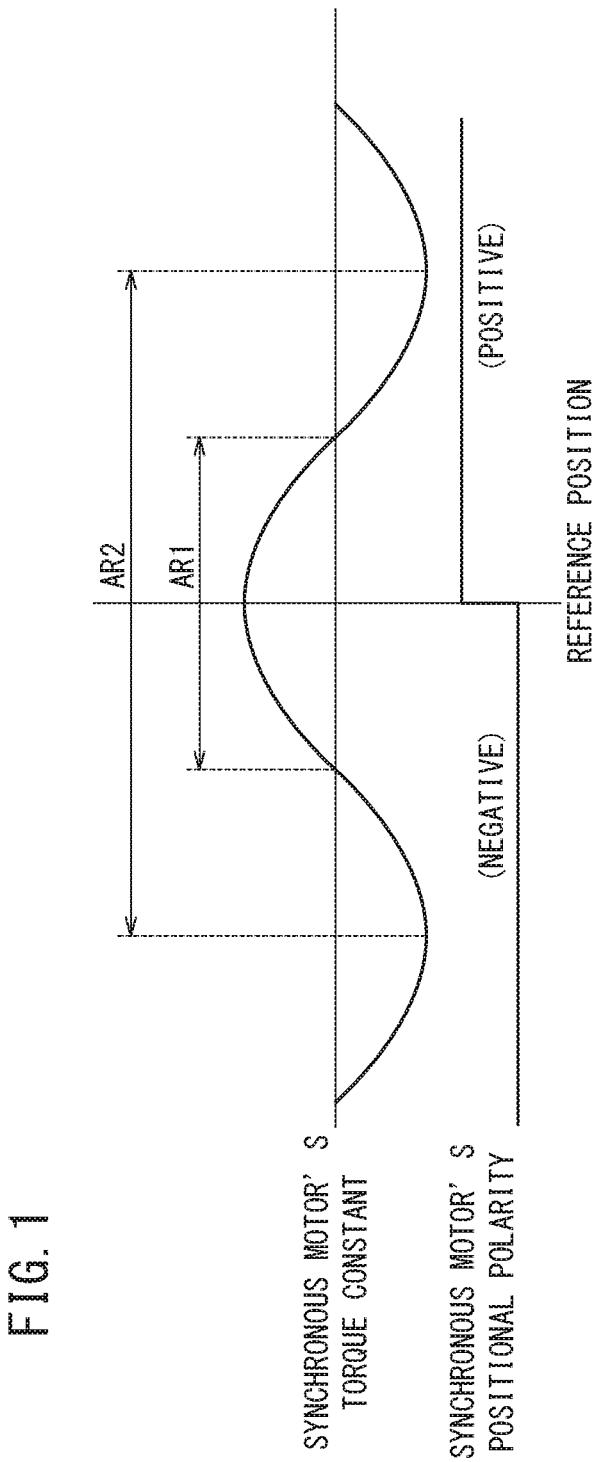
FIG. 1 is a diagram showing a relationship between the torque constant and the positional polarity in a synchronous motor.

FIG. 1 is a diagram showing a relationship between the torque constant and the positional polarity in a synchronous motor. The torque generated in a synchronous motor is given by the product of the torque constant and the current. This torque constant varies periodically according to the magnetic pole position in the synchronous motor. Therefore, when the movable range of the synchronous motor is limited within a range AR1 in which the torque constant is positive in polarity, the polarity of the torque generated in the synchronous motor can be controlled by the polarity of the current.

Under the above limitation, the position of the synchronous motor when a magnetic pole position is located on one side of rotation from a reference position is defined as the positive polarity while the position of the synchronous motor when the magnetic pole position is located on the other side of rotation from the reference position is defined as the negative polarity. In this case, the position of the synchronous motor at which the polarity changes from the positive polarity to the negative polarity can be regarded as the magnetic pole position. The positional polarity of the synchronous motor can be detected by a polarity sensor.

Figure 2:
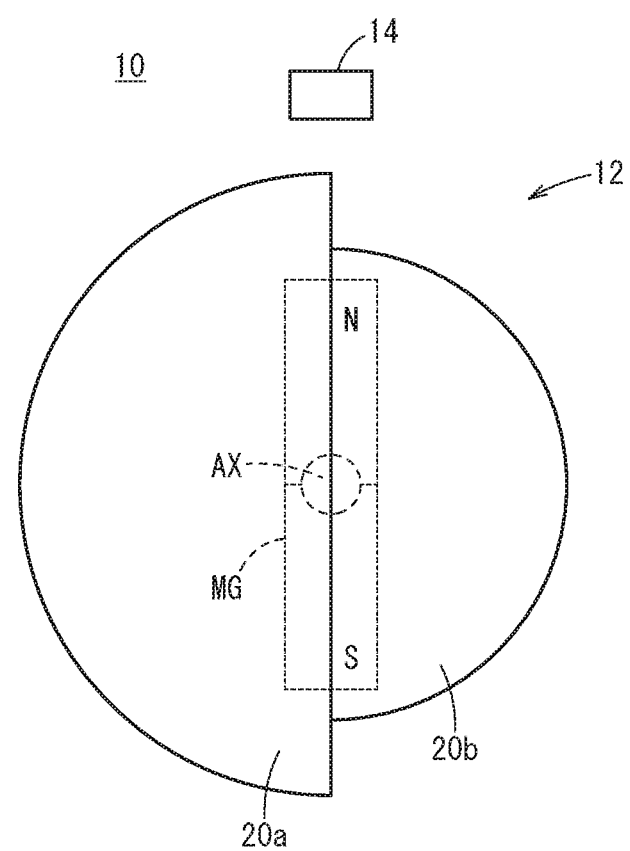
FIG. 2 is a schematic diagram showing a configuration example of a polarity sensor.

FIG. 2 is a schematic diagram showing a configuration example of a polarity sensor. A polarity sensor 10 includes a rotating body 12 that rotates together with a rotary shaft AX of the rotor of the synchronous motor and a detector 14 that detects the rotor position (the position of the synchronous motor). The position where the detector 14 is disposed is the reference position.

The rotor is equipped with a magnet MG, and this magnet MG in this embodiment is assumed to have two poles. For the sake of convenience, in FIG. 2 the shape of the magnet MG is shown as a rectangular shape. In a synchronous motor with two poles, the rotation angle (mechanical angle) of the rotor and the phase (electrical angle) of the current output to the stator coincide with each other.

The rotating body 12 is a detected member to be used when the rotor position is detected, and includes a first detected part 20a for detecting that the rotor position resides in the positive polarity and a second detected part 20b for detecting that the rotor position resides in the negative polarity. The magnet MG is arranged with the S and N poles aligned along the boundary between the first detected part 20a and the second detected part 20b. In the present embodiment, the position of the N pole is defined as the magnetic pole position.

The first detected part 20a is formed in a semicircular shape. The second detected part 20b also has a semicircular shape but a smaller radius than that of the first detected part 20a, and is formed on the opposite side of the first detected part 20a.

Therefore, the detector 14 magnetically detects the distance from the detector 14 in accordance with the rotation of the rotating body 12, whereby it is possible to detect the rotor's positional polarity. That is, when the first detected part 20a faces the detector 14, the detector 14 can detect that the rotor position resides in the positive polarity. On the other hand, when the second detected part 20b faces the detector 14, the detector 14 can detect that the rotor position resides in the negative polarity. Here, the polarity sensor 10 may be one that optically detects the rotor's positional polarity.

Figure 3:
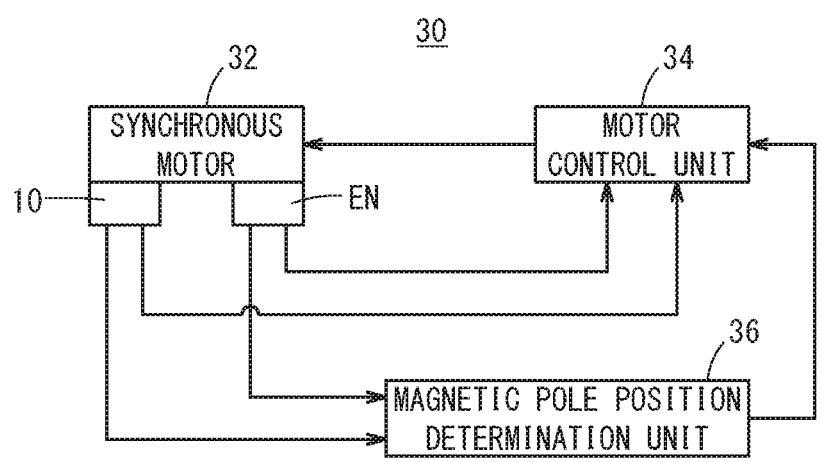
FIG. 3 is a schematic diagram showing the configuration of a motor control device.

Next, a motor control device for controlling the synchronous motor using the above polarity sensor 10 will be described. FIG. 3 is a schematic diagram showing a configuration of a motor control device. A motor control device 30 of the present embodiment mainly includes a synchronous motor 32, a motor control unit 34 and a magnetic pole position determination unit 36.

The synchronous motor 32 has an unillustrated rotor and stator, the above-described polarity sensor 10 and an incremental encoder EN. The polarity sensor 10 detects the rotor's positional polarity and outputs a polarity signal indicating the polarity to the motor control unit 34 and to the magnetic pole position determination unit 36.

The incremental encoder EN is a position detector that detects the rotor position (rotational position of the rotor), and outputs the detection result of the rotor position (rotational position of the rotor) as a detection signal.

The motor control unit 34 performs feedback control of the synchronous motor 32 based on the detection signal output from the incremental encoder EN. When the power supply is turned on, the motor control unit 34 recognizes the polarity of the current rotor position based on the polarity signal output from the polarity sensor 10, and turns the rotor from the recognized polarity side toward the opposite polarity side via the reference position.

The magnetic pole position determination unit 36 starts operating when the power supply is turned on, and monitors the rotor's positional polarity based on the polarity signal output from the polarity sensor 10. Further, the magnetic pole position determination unit 36 determines, as the magnetic pole position, the rotor position at which the rotor's positional polarity changes, based on the detection signal output from the incremental encoder EN.

When determining the magnetic pole position, the magnetic pole position determination unit 36 notifies the motor control unit 34 of the rotor position determined as the magnetic pole position. Thus, the motor control unit 34 can grasp the magnetic pole position at the time of power-on even if the information on the rotor position is not held or stored at the time of power-off.

Figure 4:
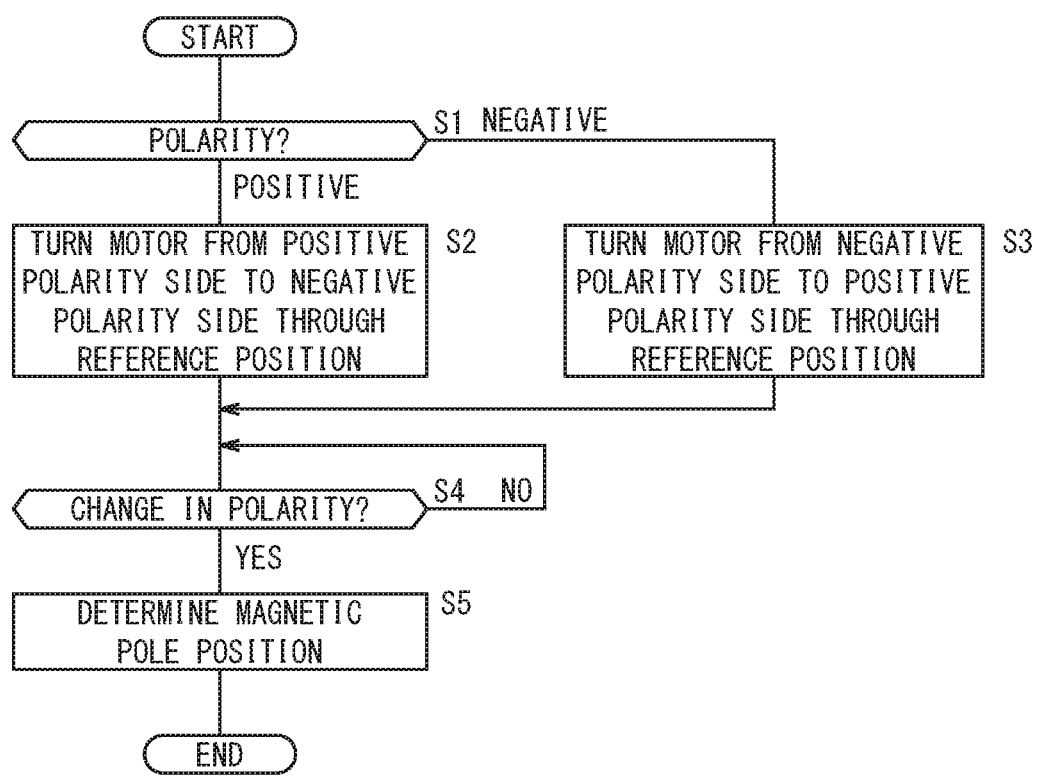
FIG. 4 is a flowchart showing the flow of a motor control process in the first embodiment.

Next, description will be given on a method for controlling the motor by the motor control device 30, which is turned on under the condition that the movable range of the rotor is limited within the range AR1 in which the torque constant resides in the positive polarity, by providing a guard or the like that regulates the rotation of the rotor. FIG. 4 is a flowchart showing the flow of a motor control process in the motor control device 30.

At step S1, the motor control unit 34 of the motor control device 30 recognizes whether the current rotor position resides in the positive polarity or the negative polarity, based on the polarity signal output from the polarity sensor 10.

Figure 5:
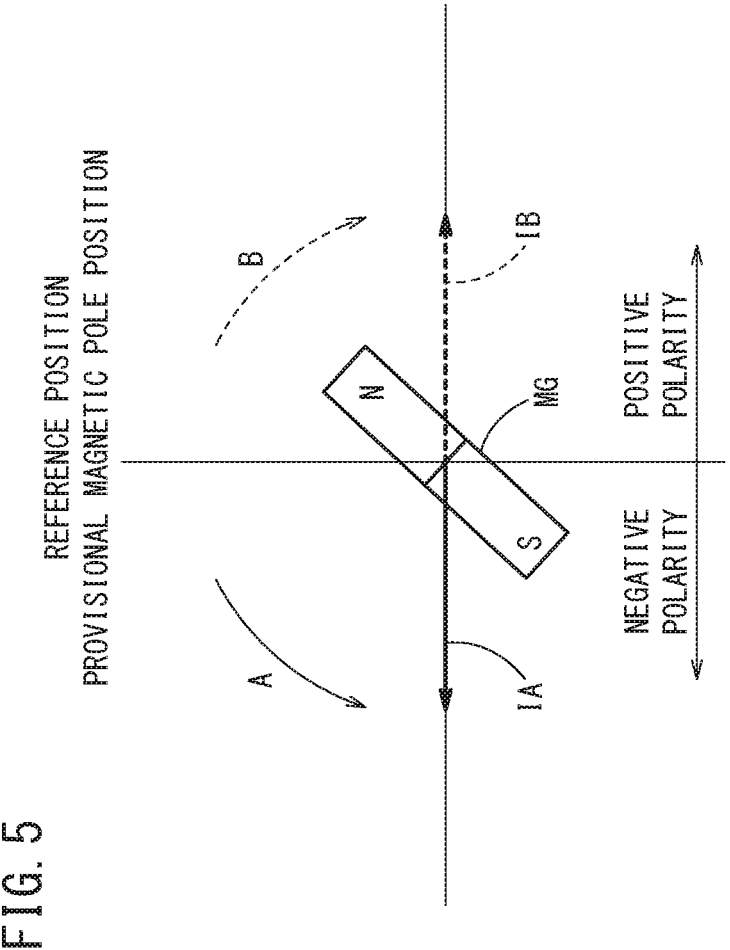
FIG. 5 is a conceptual diagram showing how the motor operates to turn in accordance with the polarity of the magnetic pole position in the first embodiment.

Here, as shown in FIG. 5, when the current rotor position is in the positive polarity, the control of the motor control unit 34 proceeds to step S2. At step S2, the motor control unit 34 sets a provisional magnetic pole position of the rotor at the reference position and turns the rotor from the positive polarity toward the negative polarity through the reference position, as shown by an arrow A. Specifically, the motor control unit 34 supplies a current, as indicated by the arrow IA, having a phase shifted by 90 degrees in terms of electrical angle toward the negative polarity from the reference position set as the provisional magnetic pole position, to the stator of the synchronous motor 32. Then the control proceeds to step S4.

On the other hand, although not shown in FIG. 5, when the current rotor position is in the negative polarity, the control of the motor control unit 34 proceeds to step S3. At step S3, the motor control unit 34 sets a provisional magnetic pole position of the rotor at the reference position, and turns the rotor from the negative polarity to the positive polarity through the reference position as indicated by a dashed arrow B. Specifically, the motor control unit 34 supplies a current, as indicated by the dashed arrow IB, having a phase shifted by 90 degrees in terms of electrical angle toward the positive polarity from the reference position set as the provisional magnetic pole position, to the stator of the synchronous motor 32. Then the control proceeds to step S4.

At step S4, the magnetic pole position determination unit 36 of the motor control device 30 monitors the polarity signal output from the polarity sensor 10, and upon detecting the point of time at which the rotor's positional polarity changes, the control proceeds to step S5.

At step S5, the magnetic pole position determination unit 36 determines, as the magnetic pole position, the position at which the rotor is located at the moment the rotor's positional polarity changes, based on the detection signal output from the incremental encoder EN. Thereafter, the magnetic pole position determination unit 36 notifies the motor control unit 34 of the position of the rotor determined as the magnetic pole position, and then the motor control process to be executed at the time of power-on is completed.

As described above, the motor control device 30 of the present embodiment determines, as the magnetic pole position, the position of the rotor at which the rotor's positional polarity changes while the rotor is rotating from the polarity detected at power-on toward the opposite polarity through the reference position. Therefore, the magnetic pole position can be grasped by only a single rotation control on the rotor. Thus, according to the motor control device 30 of the present embodiment, it is possible to shorten the time required to detect the magnetic pole position.

Second Embodiment

Though, in the above embodiment the movable range of the rotor is limited within the range AR1 in which the torque constant is positive in polarity, in this embodiment the movable range of the rotor is limited to a range AR2 (see FIG. 1) which is wider than the range AR1, by providing a guard or the like that regulates the rotation of the rotor. Now, a motor control method of the motor control device 30 that is powered on in this state will be described.

The configuration of the motor control device according to the second embodiment is the same as that of the above-described motor control device 30, description thereof is therefore omitted. Components similar to those described in the first embodiment are allotted with the same reference numerals, and repeated description is omitted except when particularly needed.

Figure 6:
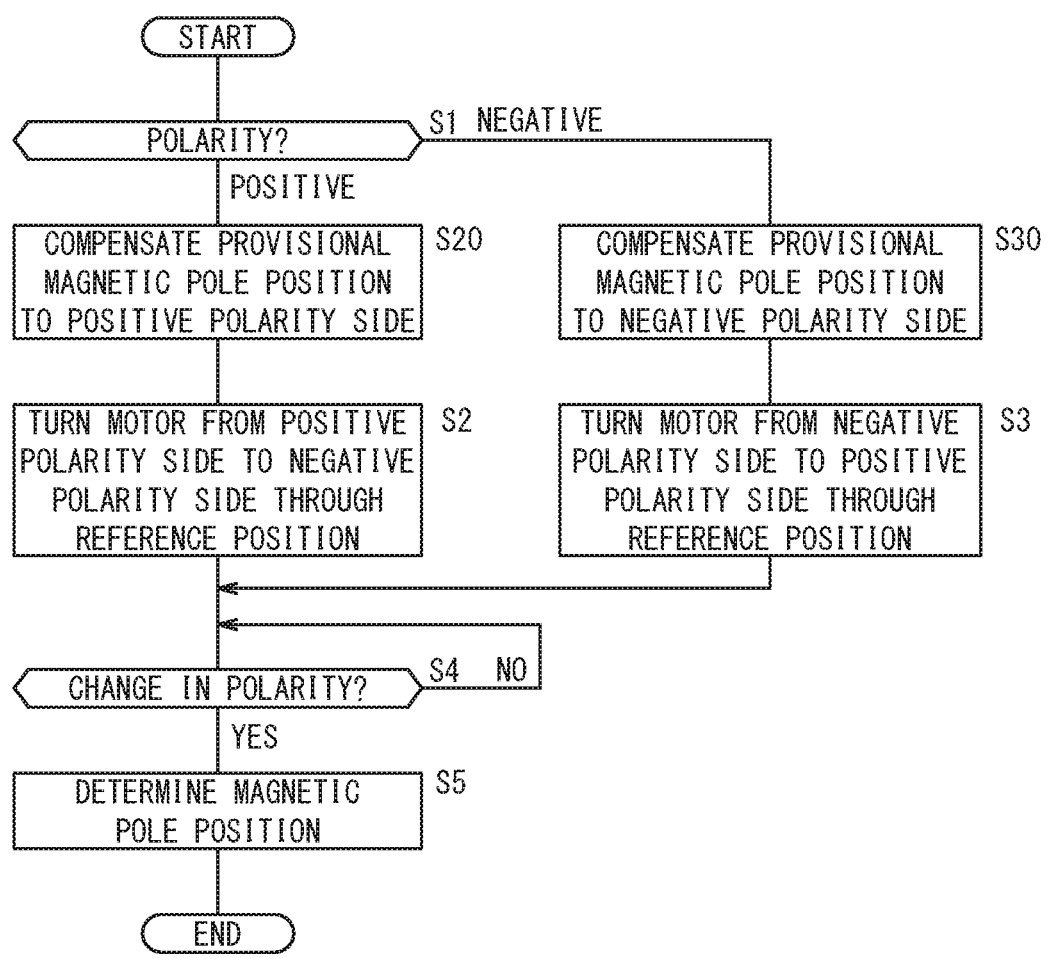
FIG. 6 is a flowchart showing the flow of a motor control process in the second embodiment.

FIG. 6 is a flowchart showing the flow of a motor control process in the motor control device 30. In the case where the movable range of the rotor is limited to the range AR2 that is wider than the range AR1 where the torque constant is positive in polarity, steps of compensating the provisional magnetic pole position are added.

Figure 7:
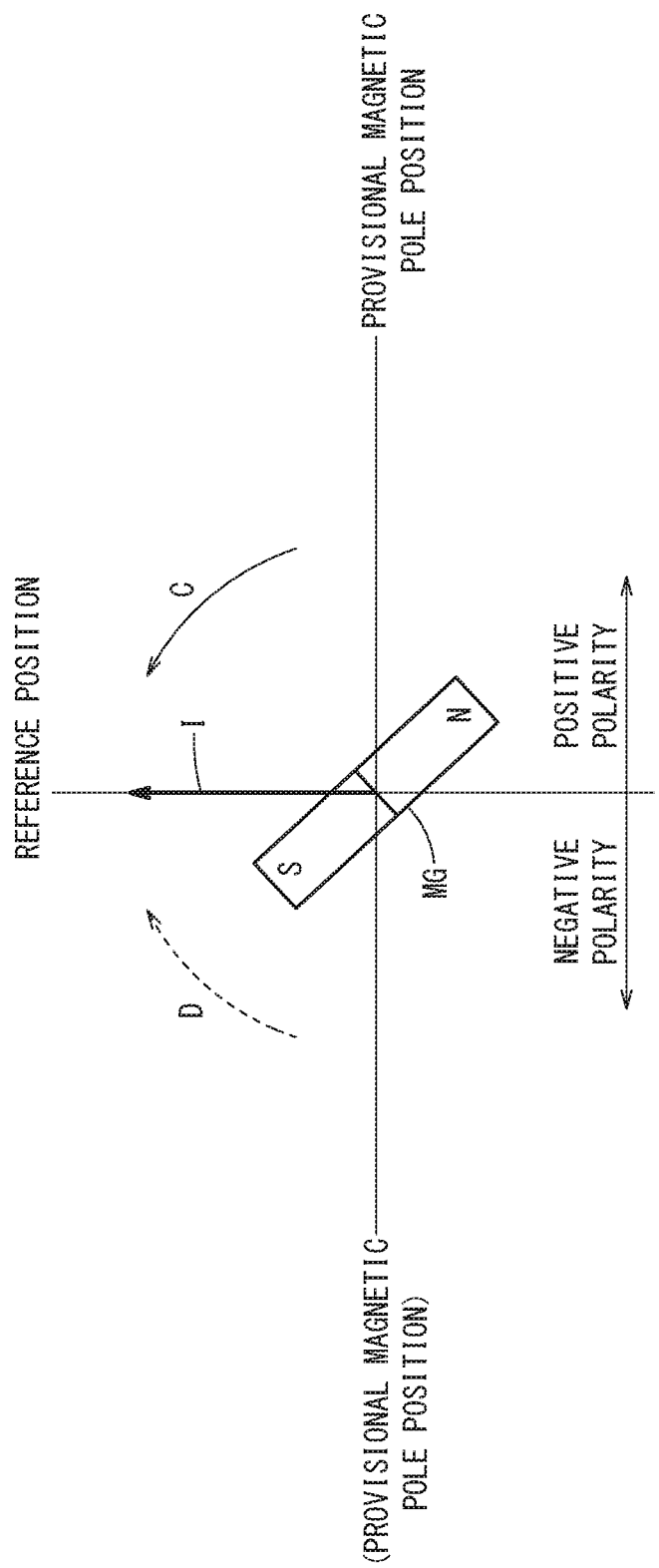
FIG. 7 is a conceptual diagram showing how the motor operates to turn in accordance with the polarity of the magnetic pole position in the second embodiment.

Specifically, as shown in FIG. 7, when the current rotor position resides in the positive polarity, the motor control unit 34, advancing from step S1 to step S20, shifts the provisional magnetic pole position from the reference position to the positive polarity side. More specifically, the motor control unit 34 sets a provisional magnetic pole position at a position that is shifted by 90 degrees in terms of electrical angle from the reference position toward the positive polarity side, and the control goes to step S2.

At step S2, the motor control unit 34 rotates the rotor from the positive polarity to the negative polarity through the reference position, as indicated by an arrow C. Specifically, as indicated by an arrow I, the motor control unit 34 supplies to the stator a current having a phase shifted by 90 degrees in terms of electrical angle toward the reference position from the provisional magnetic pole position set at step S20, and the control goes to step S4.

On the other hand, although not shown in FIG. 7, when the current rotor position is in the negative polarity side, the motor control unit 34, advancing from step S1 to step S30, shifts the provisional magnetic pole position from the reference position to the negative polarity side. More specifically, the motor control unit 34 sets a provisional magnetic pole position at a position that is shifted by 90 degrees in terms of electrical angle from the reference position toward the negative polarity side, and the control goes to step S3.

At step S3, the motor control unit 34 rotates the rotor from the negative polarity to the positive polarity through the reference position, as indicated by a dashed arrow D. Specifically, as indicated by an arrow I, the motor control unit 34 supplies to the stator a current having a phase shifted by 90 degrees in terms of electrical angle toward the reference position from the provisional magnetic pole position set at step S30, and the control goes to step S4. Here, the provisional magnetic pole position set at step S30 is shown in parentheses in FIG. 7.

As described above, in the second embodiment, also for the range AR2 that is wider than the range AR1 where the torque constant is positive in polarity, the shifting of the provisional magnetic pole position from the reference position to the positive polarity side or the negative polarity side enables the motor control device 30 to detect the magnetic pole position by only a single rotation control on the rotor.

Modified Examples

Though the above embodiments have been given as the examples of the present invention, the technical scope of the present invention is not limited to the scope described in the above embodiments. It goes without saying that various modifications or improvements can be added to the above embodiments. It is obvious from the description of the scope of the claims that modes with such modifications or improvements can be included in the technical scope of the present invention.

In the above-described embodiments, only one reference position is defined, but a plurality of reference positions may be provided. More specifically, the polarity sensor 10 may be disposed at every one cycle of the electrical angle so as to set the position of the polarity sensor 10 as the reference position. Based on the output from the polarity sensor 10 arranged at every cycle of the electrical angle, the motor control device 30 executes the motor control process shown in FIG. 4 or FIG. 6 for each cycle. In this way it is possible to avoid limiting the movable range of the rotor.

[Technical Ideas]

Technical ideas that can be grasped from the embodiments and the modified examples are described below.

[First Technical Idea]

The motor control device (30) includes: a polarity sensor (10) configured to detect whether a magnetic pole position in a synchronous motor (32) resides on a positive polarity side or a negative polarity side with reference to a reference position; a motor control unit (34) configured to turn the synchronous motor (32) from the polarity side detected by the polarity sensor (10) toward the opposite polarity side through the reference position; and a magnetic pole position determination unit (36) configured to determine, as the magnetic pole position, the position of the synchronous motor (32) at the moment when the polarity changes, based on the detection result of the polarity sensor (10).

As a result, the magnetic pole position can be grasped by only a single rotation control on the synchronous motor (32), so that the time required to detect the magnetic pole position can be shortened.

The motor control unit (34) may be configured to set a provisional magnetic pole position at the reference position and supply, to the stator of the synchronous motor (32), a current having a phase shifted by 90 degrees in terms of electrical angle from the provisional magnetic pole position toward a polarity side opposite to the polarity side detected by the polarity sensor (10). This also shortens the time required to detect the magnetic pole position.

The motor control unit (34) may be configured to set a provisional magnetic pole position at a position that is shifted by 90 degrees in terms of electrical angle from the reference position to the polarity side detected by the polarity sensor (10) and supply, to the stator of the synchronous motor (32), a current having a phase shifted by 90 degrees in terms of electrical angle from the provisional magnetic pole position toward the reference position. This also shortens the time required to detect the magnetic pole position. Further, the limited movable range of the synchronous motor (32) can be set to be larger than the movable range where the torque constant is positive in polarity.

[Second Technical Idea]

A motor control method includes: a first step (S1) of detecting whether a magnetic pole position in a synchronous motor (32) resides on a positive polarity side or a negative polarity side with reference to a reference position; a second step (S2, S3, S20, S30) of turning the synchronous motor (32) from the polarity side detected at the first step (S1) toward the opposite polarity side through the reference position; and a third step (S5) of determining, as the magnetic pole position, the position of the synchronous motor (32) at the moment when the polarity changes.

As a result, the magnetic pole position can be grasped by only a single rotation control on the synchronous motor (32), so that the time required to detect the magnetic pole position can be shortened.

The second step (S2, S3, S20, S30) may set a provisional magnetic pole position at the reference position and supply, to the stator of the synchronous motor (32), a current having a phase shifted by 90 degrees in terms of electrical angle from the provisional magnetic pole position toward a polarity side opposite to the polarity side detected by the first step (S1). This also shortens the time required to detect the magnetic pole position.

The second step (S2, S3, S20, S30) may set a provisional magnetic pole position at a position that is shifted by 90 degrees in terms of electrical angle from the reference position to the polarity side detected at the first step (S1) and supplies, to the stator of the synchronous motor (32), a current having a phase shifted by 90 degrees in terms of electrical angle from the provisional magnetic pole position toward the reference position. This also shortens the time required to detect the magnetic pole position. Further, when the movable range of the synchronous motor (32) is limited, the limited movable range can be set to be larger than the movable range where the torque constant is positive in polarity.

What is claimed is:

1. A motor control device comprising:
    a polarity sensor configured to detect whether a magnetic pole position in a synchronous motor resides on a positive polarity side or a negative polarity side with reference to a reference position;
    a motor control unit configured to turn the synchronous motor from the polarity side detected by the polarity sensor toward an opposite polarity side through the reference position; and
    a magnetic pole position determination unit configured to determine, as the magnetic pole position, a position of the synchronous motor at a moment when a polarity changes, based on a detection result of the polarity sensor.

2. The motor control device according to claim 1, wherein the motor control unit is configured to set a provisional magnetic pole position at the reference position and supply, to a stator of the synchronous motor, a current having a phase shifted by 90 degrees in terms of electrical angle from the provisional magnetic pole position toward a polarity side opposite to the polarity side detected by the polarity sensor.

3. The motor control device according to claim 1, wherein the motor control unit is configured to set a provisional magnetic pole position at a position that is shifted by 90 degrees in terms of electrical angle from the reference position to the polarity side detected by the polarity sensor and supply, to a stator of the synchronous motor, a current having a phase shifted by 90 degrees in terms of electrical angle from the provisional magnetic pole position toward the reference position.

4. A motor control method comprising:
    a first step of detecting whether a magnetic pole position in a synchronous motor resides on a positive polarity side or a negative polarity side with reference to a reference position;
    a second step of turning the synchronous motor from the polarity side detected at the first step toward an opposite polarity side through the reference position; and
    a third step of determining, as the magnetic pole position, a position of the synchronous motor at a moment when a polarity changes.

5. The motor control method according to claim 4, wherein the second step sets a provisional magnetic pole position at the reference position and supply, to a stator of the synchronous motor, a current having a phase shifted by 90 degrees in terms of electrical angle from the provisional magnetic pole position toward a polarity side opposite to the polarity side detected by the first step.

6. The motor control method according to claim 4, wherein the second step sets a provisional magnetic pole position at a position that is shifted by 90 degrees in terms of electrical angle from the reference position to the polarity side detected at the first step and supplies, to a stator of the synchronous motor, a current having a phase shifted by 90 degrees in terms of electrical angle from the provisional magnetic pole position toward the reference position.

* * * * *